United States Patent [19]

Lutz

[11] Patent Number: 4,529,349
[45] Date of Patent: Jul. 16, 1985

[54] ROLL-OFF HOIST

[76] Inventor: Theodore A. Lutz, Box 276, Rochester Rd., Sewickley, Pa. 15143

[21] Appl. No.: 492,476

[22] Filed: May 6, 1983

[51] Int. Cl.³ .............................................. B60P 1/28
[52] U.S. Cl. .................................... 414/478; 414/421; 414/494; 414/786
[58] Field of Search ............... 414/421, 477, 478, 479, 414/480, 491, 494, 500, 786

[56] References Cited

U.S. PATENT DOCUMENTS

| | | | |
|---|---|---|---|
| 2,468,502 | 4/1949 | Lisota | 414/477 |
| 2,485,300 | 10/1949 | Lisota | 414/477 |
| 2,621,814 | 12/1952 | Lisota | 414/477 |
| 4,109,810 | 8/1978 | Jones | 414/477 |

Primary Examiner—Robert G. Sheridan
Attorney, Agent, or Firm—Clifford A. Poff; Thomas H. Murray

[57] ABSTRACT

A roll-off hoist is mounted onto a vehicle to swing about a pivot at the aft end of the vehicle while the hoist moves along a slide plate supported by the pivot. A piston and cylinder assembly is coupled between the slide plate and the aft end of the hoist rails. As the hoist rails jut from the rear of the vehicle chassis, other piston and cylinder assemblies cause the forward portion of the hoist rails to swing above the chassis. The aft end portion of the hoist rails descends to ground level to receive the forward portion of a roll-off container which is drawn onto the hoist rails by a powerful winch. The piston and cylinder assemblies connected to the forward portion of the hoist rails are used to swing the hoist rails about the pivot while the piston and cylinder assembly in the rear portion of the hoist rails is inoperative to thereby elevate a container with the forward portion thereof extending high above ground level for dumping material in the container from an opening at the aft portion thereof.

8 Claims, 12 Drawing Figures

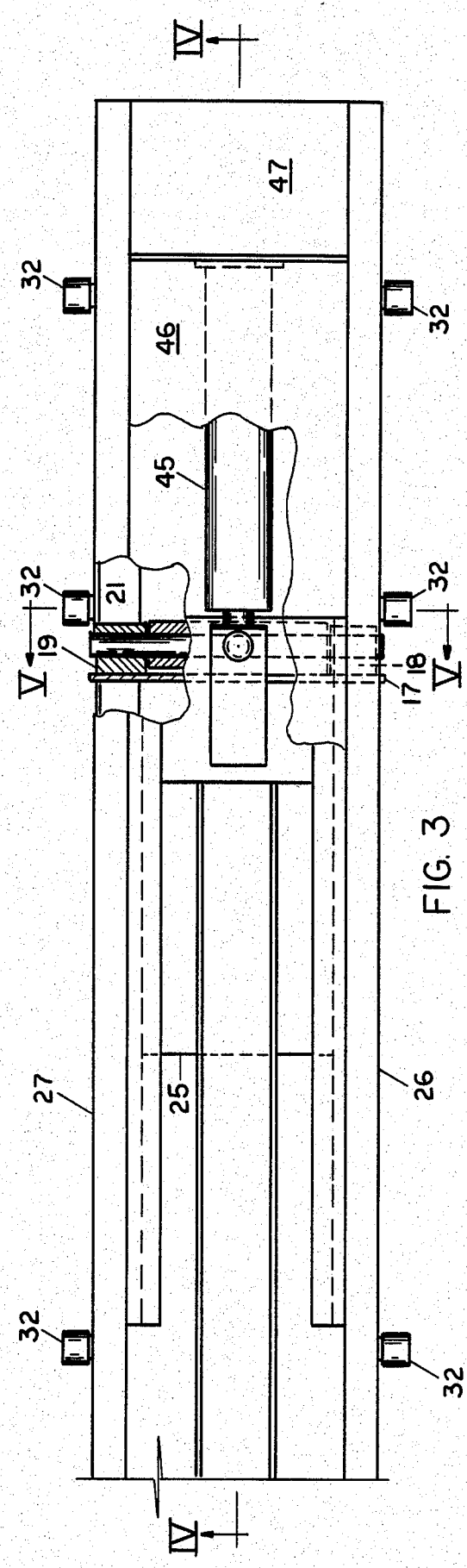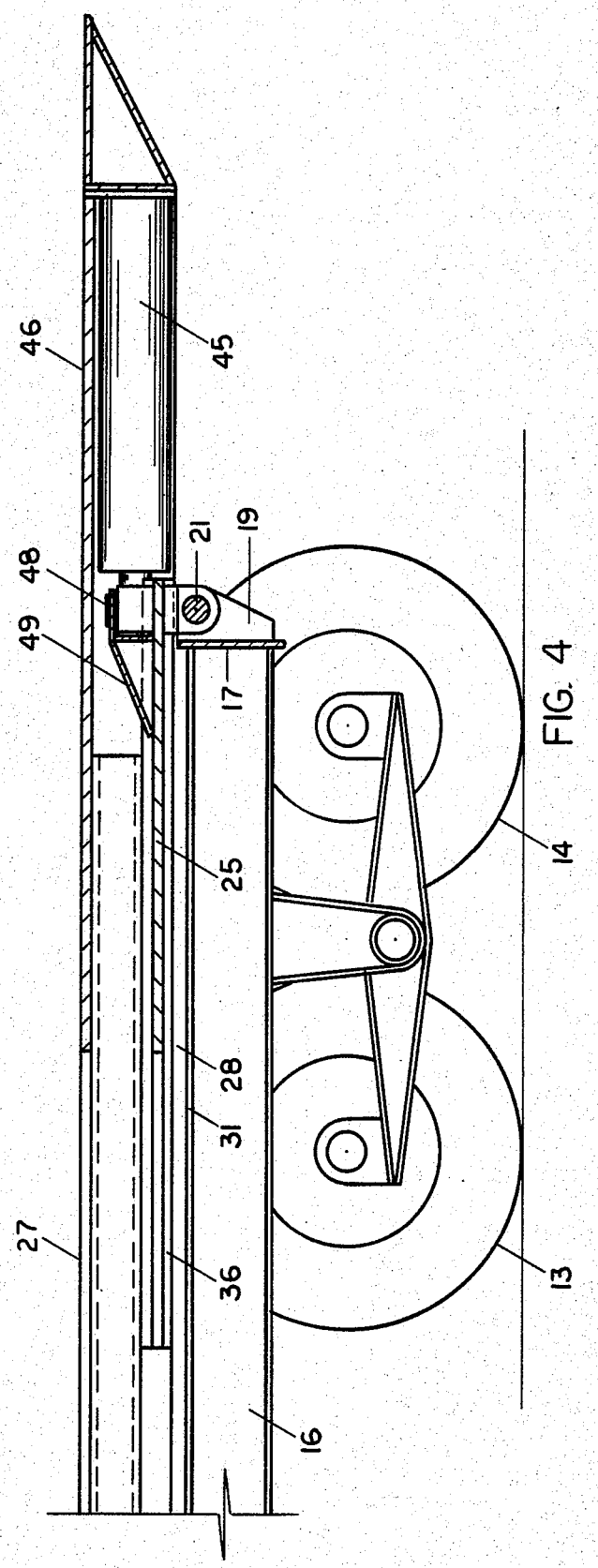

ROLL-OFF HOIST

BACKGROUND OF THE INVENTION

This invention relates to a roll-off hoist apparatus and method for loading and/or unloading a container onto a vehicle such as a truck used to transport the container. More particularly, the present invention relates to an apparatus to slide a unitary hoist frame along a chassis frame to jut and descend from the rear of the vehicle substantially to ground level while a forward portion of the hoist frame is swung about a pivot above the vehicle frame on piston and cylinder assemblies when loading the container onto the vehicle and when dumping material from the container; the piston and cylinder assemblies are operated to only swing the hoist frame about the pivot.

It is present-day practice to accumulate a load of waste or refuse material in a transportable container while supported on the ground by skids or rollers forming part of an understructure. The container is a large weldment with reinforced walls and usually referred to as a roll-off container. The storage capacity of the container is at least 15 cubic yards but usually not in excess of 65 cubic yards. Most containers have a capacity of 30 to 40 cubic yards. The weight of the container is relatively large even when empty. At least about 80% of the containers in use today have a standard understructure to engage with a hoist for loading and unloading the container onto a vehicle. The understructure includes spaced-apart and parallel rails projecting from the container bottom along the length thereof and wheels or skids at the four corners of the container bottom. Between these rails or outside of these rails are recessed longitudinal rails to slide along rails of a roll-off hoist during loading and unloading of the container. Some hoists will only accommodate containers where the outside rails of the understructure rail protrude downwardly below recessed rails. Most hoists will accommodate a roll-off container with either rail configuration. The hoist has parallel rails which can engage with the recessed rails in the understructure of the container and a series of rollers at spaced locations along the rails on the hoist can engage with the downwardly-protruding rails of the understructure of the container.

To load a roll-off container onto the vehicle, the vehicle is backed into a position squarely confronting the forward end of the container so that the rails of the container align with the rails on the hoist. The hoist is then swung about a pivot at the rear of the vehicle by operation of piston and cylinder assemblies connected between the vehicle and opposite forward sides of the hoist. The pivot is fixedly positioned on a rear frame portion of the vehicle to form a horizontal axis about which the hoist swings. Some hoists are constructed so that a portion of the hoist protrudes from the rear portion of the vehicle a sufficient distance so that upon swinging of the hoist, the rear portion of the hoist moves downwardly toward the ground until a ground roller on the end of the hoist frame touches the ground. Other hoists are constructed with a relatively short protruding aft portion at the rear of the vehicle whereby the container must be lifted several feet until the understructure of the container engages with the rails of the hoist. The free end of a cable of a powerful winch on the hoist is drawn out so that a hook on the end portion can be connected to a hook on the container. The container is then advanced by the winch along a hoist until the center of gravity of the container is forward of the rear pivot, whereupon the hoist is swung downwardly onto the frame of the vehicle. The container is then pulled forwardly against front stops on the hoist.

When setting off a container or dumping material from the container, the hoist must be swung about the rear pivot to elevate the forward end of the container high above the vehicle. When dumping material from the container, the doors are opened before the container is elevated so that the material can slide out of the opening at the rear of the container when it is elevated. Sometimes a push-out blade is incorporated in the container to facilitate removal of material therefrom. When it is intended to set off a container from the vehicle, after the container is swung with the hoist about the rear pivot, the winch is operated to feed out the cable and permit the container to slide along the hoist until the rear portion of the container engages the ground. Thereafter, the vehicle is slowly advanced while the forward end of the container slides along the rails of the hoist and into contact with the ground.

Another design of a hoist embodies a so-called stinger tail section. The tail section which is an independent weldment has square tubes forming spaced-apart rails that can fit inside other tubes forming rails on the hoist that terminate at the rear portion of the hoist frame. A piston and cylinder assembly is used to extend the tail section when the hoist frame is swung about the pivot so that the tail section spans the gap between the hoist frame and the ground. After a container is moved onto the hoist frame, the tail section is retracted by the piston and cylinder assembly. The roll-off container is wholly supported by the frame of the hoist. In this way, the overhung portion of the hoist can be minimized. This hoist design suffers from the acute disadvantages that the separate tail section lacks structural integrity to withstand the loads and rigorous pounding during loading and unloading of containers. The tail section deteriorates rapidly at the junction between the tail section and the hoist frame because the rails of the container's understructure upset the metal of the frame each time the container rails drop onto the rails of the extendible tail section. Moreover, the piston and cylinder assembly used to extend and retract the tail section cannot be protected from damage caused by a derailed container during a loading or unloading operation.

The present invention seeks to overcome the shortcomings and disadvantages of known roll-off hoist assemblies while at the same time substantially reduce the tremendous amount of motion and time lost when lifting or setting off a container. Known hoist designs can only swing about their pivoted rear connection so that the rear portion of the hoist rails can be lowered. The forward end of the hoist is usually swung about 17 or more feet above ground level. When a filled container is to be replaced by an empty container at a particular site, the operator must first unload an empty container from the vehicle; reposition the vehicle to load the filled container onto the vehicle; unload the loaded container from the vehicle at a closely-spaced site; reload and transport the empty container to the particular site where it is to receive material; and then reload the filled container for transportation by the vehicle. Because of the relatively large size of the container and the tremendous weight, e.g., 30 tons, that must be handled, the container loading and unloading operations are very time consuming but must be carried out in a slow and careful manner.

A further aspect of the present invention seeks to alleviate the need to elevate the forward end of the hoist frame about the pivot at the rear portion of the vehicle to such an extent that it is normally impossible to load a container onto a vehicle within a building having a restricted ceiling height.

SUMMARY OF THE INVENTION

It is an object of the present invention to provide an improved hoist apparatus and a method of loading a container onto a vehicle in which the entire hoist can be moved along a pivotal slide at the rear portion of the vehicle, causing the rear portion of the hoist to jut from the vehicle toward the ground and in which the entire hoist can only swing about a pivot at the rear of the vehicle by operation of piston and cylinder assemblies engaging the forward part of the hoist.

More particularly, according to one aspect of the present invention, there is provided a roll-off hoist apparatus including a pair of parallel and spaced-apart hoist frame rails having guides thereon to slide along a carrier supported by a pivot at the rear of a chassis frame, piston and cylinder assemblies linking the forward portion of the hoist frame rails to the chassis frame for swinging the rails about the pivot, and actuator means for sliding the hoist frame rails along the carrier to jut from the rear of the chassis frame downwardly to ground level while the rails are constrained by the piston and cylinder assemblies to swing the forward ends of the rails above the chassis frame.

In another aspect of the present invention, there is provided a method to position a roll-off container on a wheeled vehicle wherein the method includes the steps of swinging a forward portion of parallel hoist frame rails above a vehicle chassis while sliding the hoist frame rails to jut from the aft portion of the vehicle substantially to ground level, pulling a container at ground level onto and along the hoist frame rails, moving the hoist frame rails into a generally parallel and supported relation on the frame members of the vehicle chassis, transporting the roll-off container to a dump site for dumping the contents thereof, and dumping material from an opening in the aft end of the roll-off container by swinging the hoist frame rails and roll-off container engaged therewith about a pivot at the rear of the vehicle frame by actuating piston and cylinder assemblies coupled between the forward portions of the hoist frame rails and the vehicle chassis.

These aspects and features of the present invention as well as others will be more fully understood when the following description is read in light of the accompanying drawings, in which:

FIG. 3 is a plan view, partly in section, of the aft portion of the hoist apparatus according to the present invention;

FIG. 4 is a sectional view taken along line IV—IV of FIG. 3;

Figure 1:
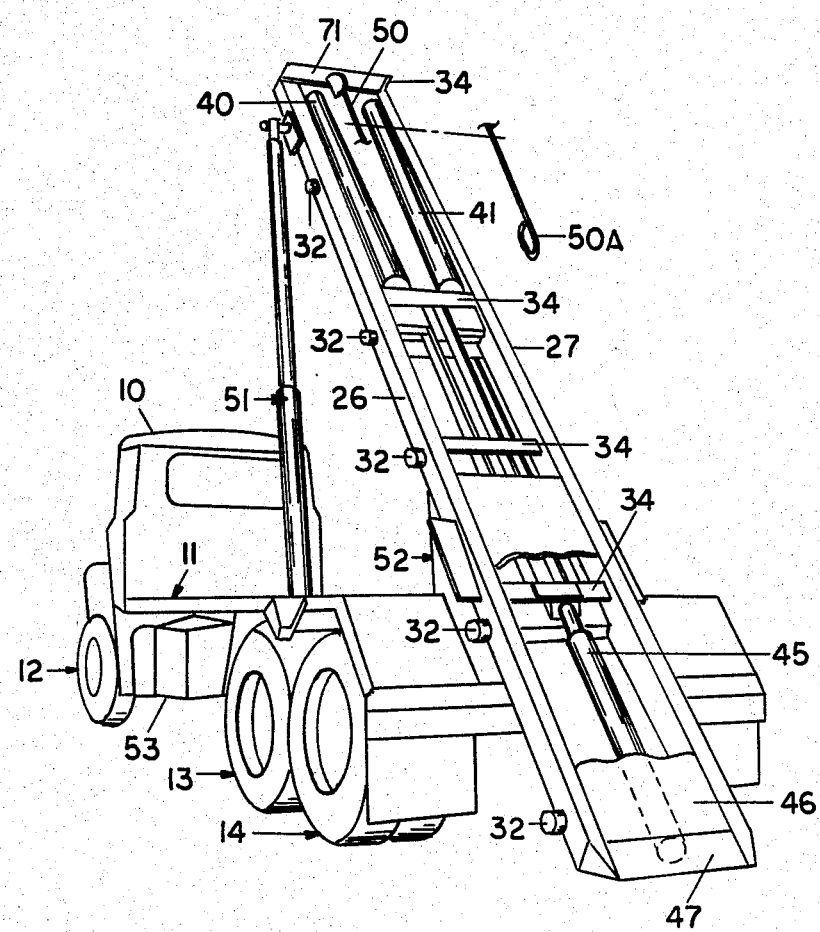
FIG. 1 is an isometric view of a roll-off hoist on a vehicle.

In FIG. 1, there is illustrated a vehicle of the type having a driver's cab 10 on the forward part of a chassis frame 11 which is supported by conventional steerable front wheel assemblies 12. The rear portion of the chassis frame is supported by tandem drive wheel assemblies 13 and 14. Other forms of vehicles may be provided with the hoist of the present invention. One such vehicle is a trailer having a fifth wheel by which the trailer is driven and controlled by a tractor in a manner, per se, well known in the art.

Figure 5:
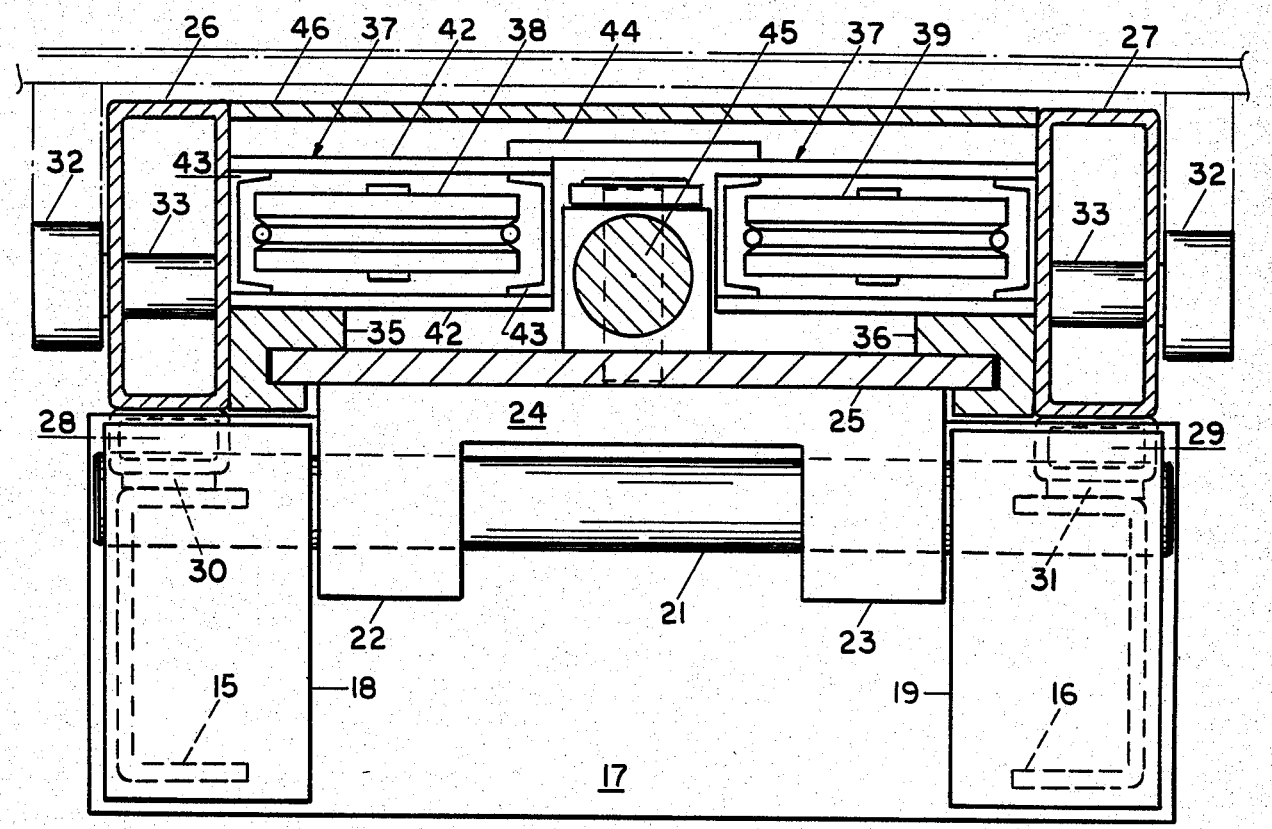
FIG. 5 is a sectional view taken along line V—V of FIG. 3.

As shown in FIGS. 4–7, the chassis 11 includes conventional spaced-apart and generally parallel chassis frame members 15 and 16 that are joined together at various locations by crossmembers. An additional crossmember is an end plate 17 welded to the aft ends of frame members 15 and 16. Two hinge plates 18 and 19 are welded to plate 17 behind the frame members 15 and 16. A pivot pin 21 is supported in bores in the hinge plates 18 and 19 and in bores in spaced-apart, downwardly-extending lugs 22 and 23 of a hinge bar 24 (FIG. 5) that fit between plates 18 and 19. The hinge bar pivots about an axis along the length of the pin. Hinge bar 24 is secured to the undersurface of a slide carrier 25 at an aft portion thereof which preferably takes the form of a rectangular plate. The carrier extends forwardly toward cab 10 from the hinge bar 24 between parallel and spaced-apart hoist rails 26 and 27 forming part of a hoist frame. These frame members are parallel with and generally overlie frame members 15 and 16, respectively, of the vehicle but interposed therebetween are subframe members 28 and 29 and spacers 30 and 31, respectively. The spacers 30 and 31 facilitate assembling of the roll-off hoist of the present invention on the frame of a vehicle. The spacers are welded to the vehicle frame and to the subframe members 28 and 29 during assembly. At each spaced-apart location on the outsides of the rails 26 and 27 there is, as shown in FIGS. 1, 3 and 5, a roller 32 supported on an arbor 33 to engage with rails of the understructure of a roll-off container. Cross braces 34 tie the rails 26 and 27 together to prevent their movement toward or away from each other.

In the embodiment of the present invention shown in FIG. 5, opposite lateral sides of the slide carrier 25 are received in elongated slots of guides 35 and 36, each having a U-shaped cross section. The opposite sides of the carrier 25 constrain the rails 26 and 27 to slide in the forward or aft direction of the vehicle chassis. The guides are welded to the hoist frame rails 26 and 27 beneath housing assemblies 37. The housing assemblies form two longitudinal chambers to slideably receive sheave blocks 38 and 39 that are clevis-mounted on the rod ends of winch cylinders 40 and 41, respectively, as shown in FIG. 1. Each housing assembly 37 is comprised of upper and lower plates 42 welded to spaced-apart channel members 43. Each of the sheave blocks 38 and 39 is supported by an arbor between clevis plates so that the sheave can rotate about a vertical axis. A tie plate 44 interconnects the plates 42 at the top of the housing assemblies and forms an elongated chamber therebetween wherein the rod end of a piston and cylinder assembly 45 is protectively housed when the piston is extended from the cylinder portion thereof. A guard plate 46 extends between the frame rails 26 and 27 above the housing assemblies 37 and from a ramp 47, which is welded to the frame rails 26 and 27, to a point forwardly beyond the hinge pin 21. The plate extends forwardly along the hoist to protectively cover the piston and cylinder assembly 45, when fully extended, to prevent damage that might otherwise occur in the event of a derailment of a container during loading and unloading operations on the hoist. The cylinder portion of assembly 45 is flange-mounted to an end wall of a crossmember forming ramp 47. The rod end of the assembly 45 is mounted by a clevis pin 48 extending through a clevis end of the piston rod and through a clevis support 49 which is secured to the slide carrier 25. A cable 50 is anchored at one end to a hoist rail and trained about a system of pulleys that includes sheave bocks 38 and 39 in a manner, per se, known in the art, so that a hook 50A on the free end of the cable can be drawn along the length of the hoist rails.

Hoist frame rails 26 and 27 extend from the ramp 47 forwardly beyond the plane of the pivot shaft along the subframe on the chassis frame to a point that is about 6 inches from the back of the driver's cab. Connected to the sides of the forward portion of the hoist frame rails are the rod ends of piston and cylinder assemblies 51 and 52 which are pivotally mounted at their cylinder ends by brackets to the chassis frame of the vehicle. The present invention provides that the piston and cylinder assemblies 51 and 52 link the forward portion of the hoist rails to the chassis frame so that the rails jut from the vehicle for loading or unloading a container. As shown in FIG. 1, a tank 53 for hydraulic fluid is supported by brackets extending laterally from a side of the vehicle frame. A pump is connected by a drive shaft to a power take-off drive of the vehicle propulsion system in a manner, per se, well known in the art. The pump delivers hydraulic fluid through a plurality of reversing control valves for separate and controlled delivery to piston and cylinder assemblies 40, 41, 45, 51 and 52.

Figure 7:
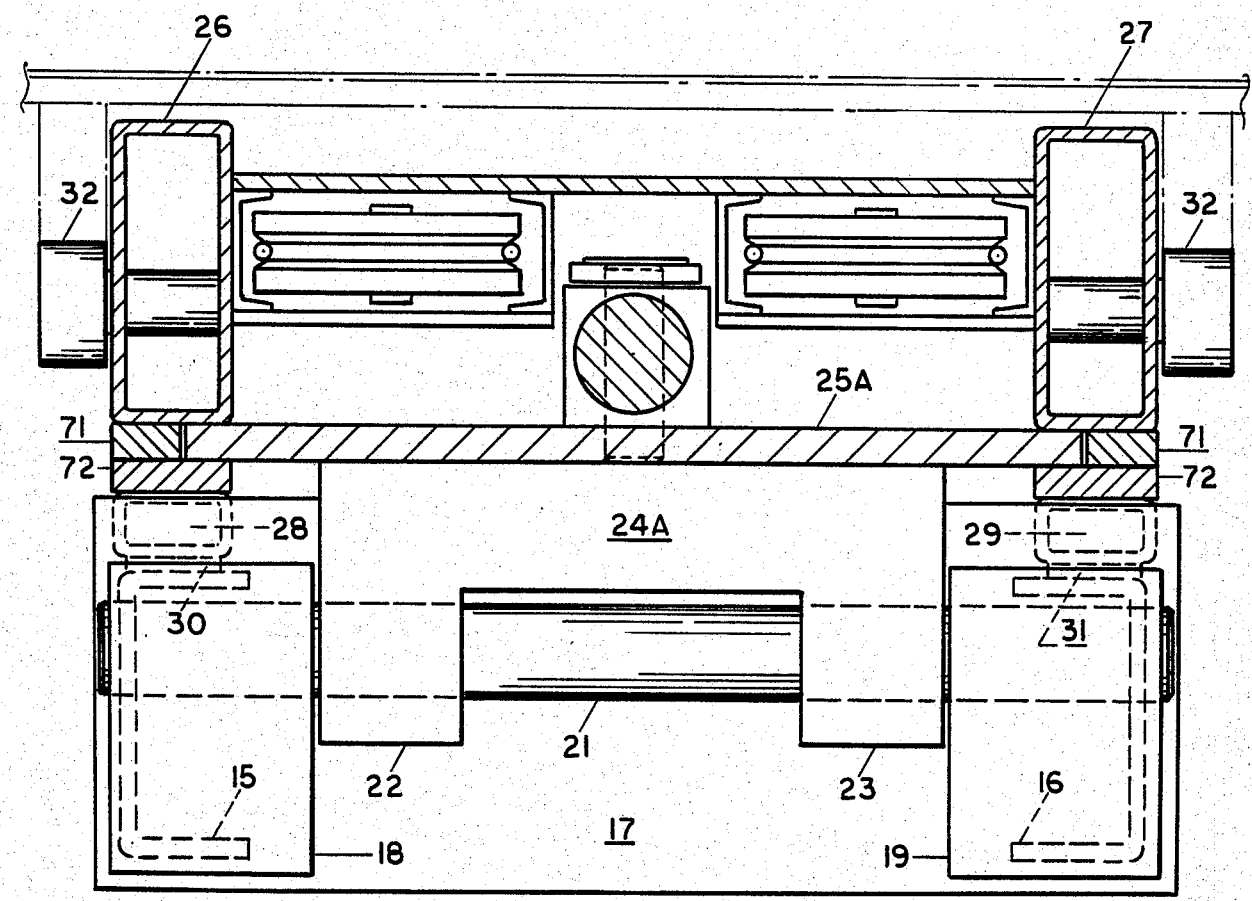
FIG. 7 is a sectional view similar to FIG. 5 but illustrating a second embodiment of the present invention.

A modification to the roll-off hoist is shown in FIG. 7. In FIG. 7, the reference numerals which are the same as reference numerals previously identified, are used to identify the same parts. The modification shown in FIG. 7 provides that a slide carrier 25A has a greater width than slide carrier 25 (FIG. 5) so as to extend midway of the width of the hoist frame rails 26 and 27 in gaps formed by spacer strips 71. The strips are welded to rails 26 and 27, as shown, and to keeper plates 72 to form guide pockets to permit sliding of the hoist frame rails along opposite sides of the slide carrier 25A. The keeper plates 72 are supported on the subframe members 28 and 29 which are secured to the chassis frames 15 and 16 as previously described. Hinge bar 24A is welded to the slide carrier 25A in the same manner as hinge bar 24 is welded to carrier 25. The hinge bar 24A includes the downwardly-extending lugs 22 and 23 and engage pivot 21.

Figure 8:
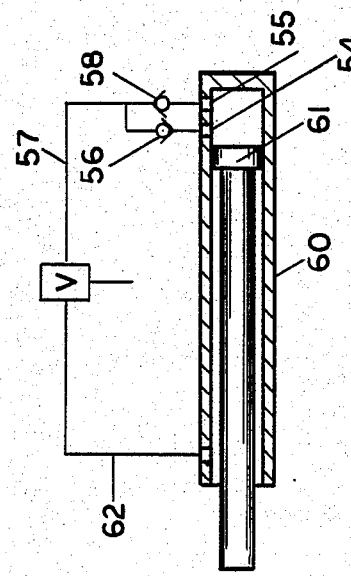
FIG. 8 is a schematic view of an arrangement of check valves to form a cushion for a hoist lift cylinder.
Figure 6:
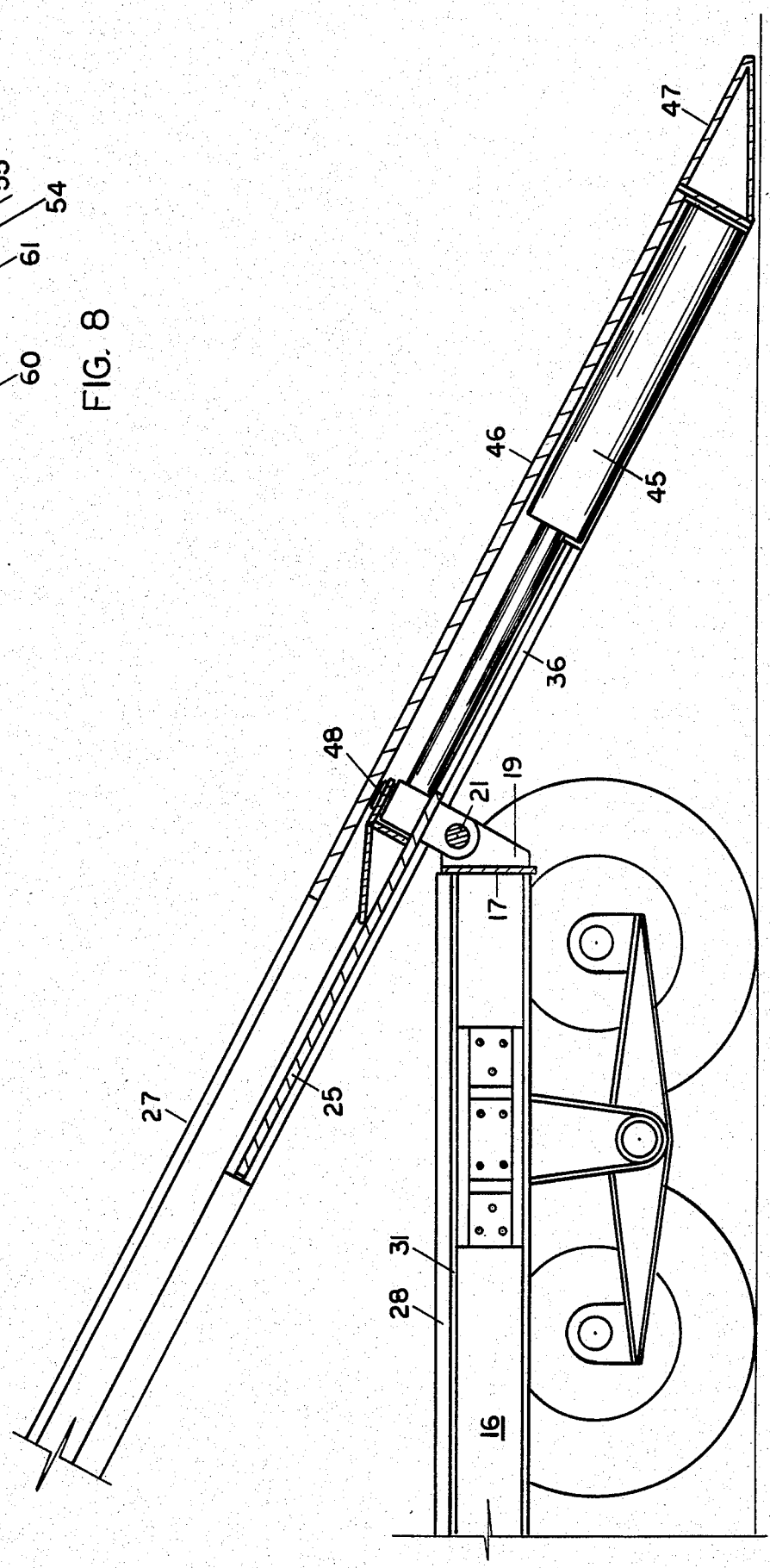
FIG. 6 is a sectional view similar to FIG. 4 but illustrating a rear portion of the hoist in a position for receiving a container or unloading a container.

To avoid damage to the piston and cylinder assemblies 51 and 52, a cushion of hydraulic fluid is always maintained between the cylinder end and the piston in each of these assemblies. As shown schematically in FIG. 8, each of the assemblies 51 and 52 has two ports 54 and 55 formed at spaced-apart locations closely adjacent the end wall of the cylinder 60. Port 54 is connected by a check valve 56 to a hydraulic supply line 57 having a branch portion which is connected by a check valve 58 to port 55. When a piston 61 is retracted along the cylinder by the introduction of hydraulic fluid through line 62 into the cylinder at the rod end thereof, hydraulic fluid is exhausted from the cylinder end portion through port 54 and thence through the check valve 56 until the piston passes beyond port 54. Hydraulic fluid can no longer be exhausted from port 54. Port 55 is blocked against exhausting of hydraulic fluid by the check valve 58. This prevents depletion of a small but effective volume of hydraulic fluid between piston 61 and the end wall of the cylinder 59 which cushions the piston against contact with the cylinder. When it is desired to extend the piston from the cylinder, fluid is admitted to the cylinder through line 57 beyond check valve 58 and through port 55.

Figure 2:
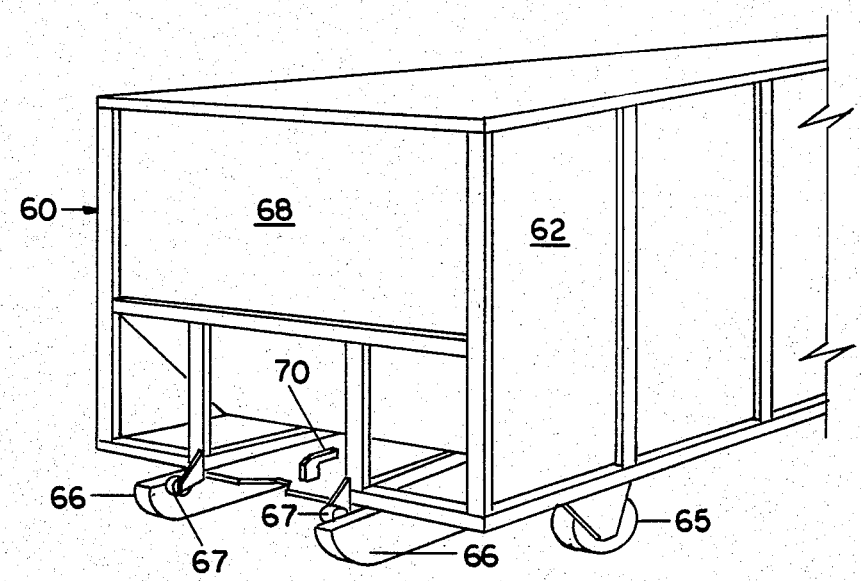
FIG. 2 is an isometric view of a roll-off container for use with the hoist of the present invention.

In FIG. 2, there is illustrated the forward end portion of a roll-off container 60 of the type which is suitable for loading and unloading onto a vehicle through the use of the roll-off hoist of the present invention. The container is, per se, known in the art and may take the form of a container disclosed in my U.S. Pat. No. 4,372,726. The container includes upstanding side walls 62, a floor wall 63 and a roof wall 64. The container is elongated and wheel assemblies 65 are provided at the four corners of the floor wall to support the container on the ground. Between the wheels, the floor supports downwardly-extending rails 66 that extend the entire length of the container. A floor plate extends between these rails. The rails 66 extend forwardly beyond a front end wall 68 of the container where they support guide rollers 67 employed to facilitate entry and discharge of the forward portion of the container onto and from the hoist on a vehicle. On the floor wall between the rails 66 is a hook 70 to which can be secured to the free end of a winch cable.

Figure 10:
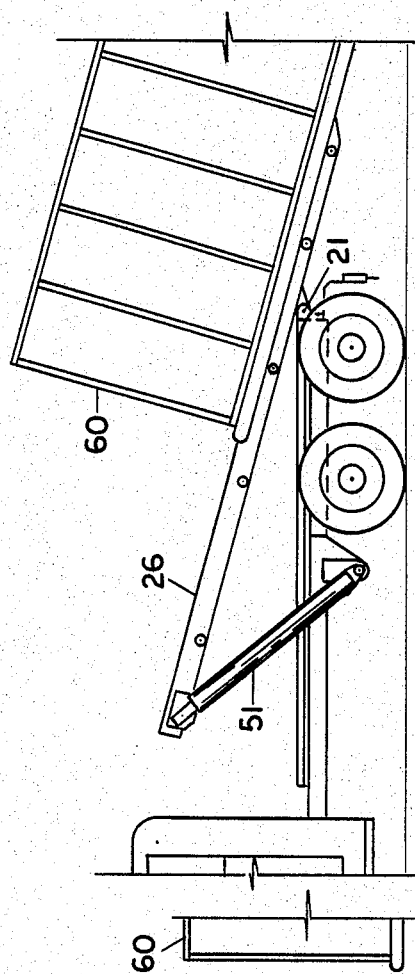
FIGS. 9, 10 and 11 illustrate successive positioning of the hoist apparatus to load a container at ground level onto a vehicle.
Figure 9:
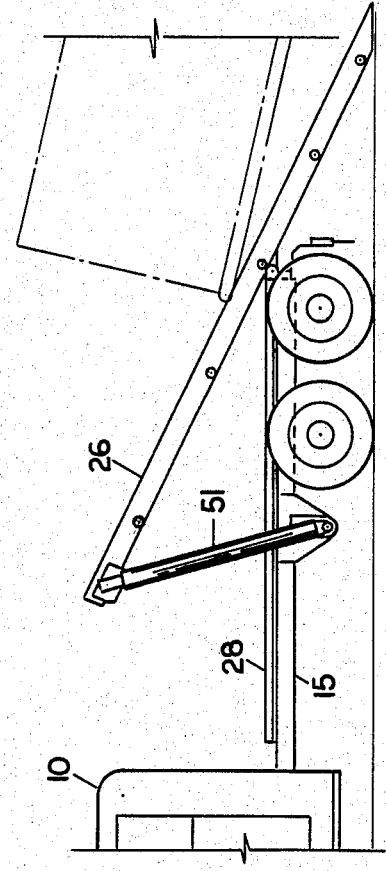
Figure 11:
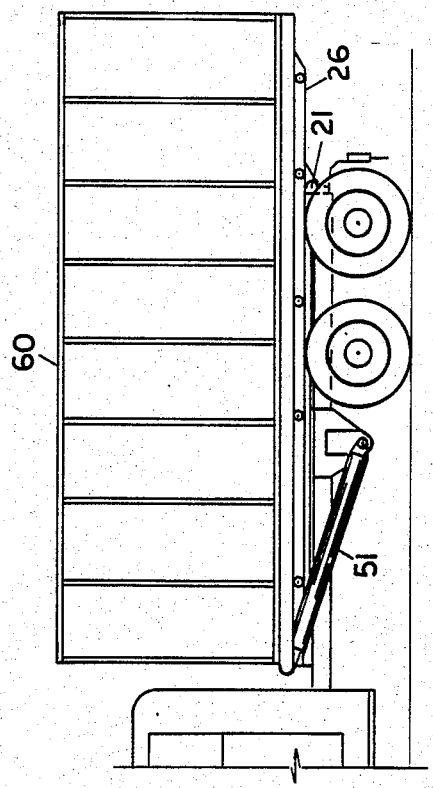

As shown in FIG. 9, the roll-off hoist of the present invention is positioned to receive a roll-off container by delivering hydraulic fluid to piston and cylinder assembly 45 which juts the hoist frame rails rearwardly along the slide carrier. As the hoist frame extends from the aft portion of the vehicle, the portion of the frame overhanging the pivot shaft 21 descends toward the ground because the forward portion of the frame is caused to swing about the piston and cylinder assemblies 51 and 52. The control valves for these piston and cylinder assemblies are placed or remain in a position so that hydraulic fluid is not supplied to either end of the piston but a cushion of hydraulic fluid is trapped and remains between the pistons and the cylinders thereof. This prevents damaging metal-to-metal contact between the pistons and cylinders under the load imposed thereon as the hoist rails swing about the linkage provided by the assemblies 51 and 52. The movement of the hoist rails continues until the ramp 47 engages the ground at a point that is closely adjacent the forward portion of the container. The cable 50 of the winch is then paid-out so that a hook 50A can be engaged with the hook 70 on the container. The winch cylinders 40 and 41 are operated to draw the container toward the hoist so that the slide bars 67 of the container engage and slide along the rollers 32 supported by rails 26 and 27 of the hoist. Continued operation of the winch draws the container along the hoist rails to a position which is generally indicated by phantom lines in FIG. 9. Thereafter, as shown in FIG. 10, the hoist rails are repositioned on the vehicle into an intermediate position by retracting the hoist rails onto the vehicle by operation of piston and cylinder assembly 45. The hoist rails are moved to a generally parallel relation with the rails of the container whereupon the winch is again operated to draw the container along the hoist rails. Concurrently therewith, if desired, the piston and cylinder assembly 45 is operated to slide the hoist rails forwardly along the vehicle into a position where the hoist rails are wholly supported on the chassis frame of the vehicle as shown in FIG. 11. The winch is operated to draw the container forwardly on the hoist rails to a point where Stop 71 (FIG. 1) a forward portion of the hoist engages with the rollers 67 on the forward portion of the container. Conventional latches may be set to interconnect the container with the hoist rails. The container can then be transported by the vehicle.

The container can be unloaded from the vehicle at a desired site by operating the piston and cylinder assembly 45 to jut the hoist rails rearwardly of the vehicle frame while the forward portion of the hoist rails 20 swings upwardly about the piston and cylinder assemblies 51 and 52 which are not supplied with hydraulic fluid. The hoist rails are swung from a position shown in FIG. 11 to a position shown in FIG. 9. The winch cylinders are then operated to pay-out cable which permits the container to slide on rollers 32 along the hoist rails until the wheels at the rear of the container engage the ground. The forward portion of the container may slide rearwardly along the hoist rails and into engagement with the ground. If necessary, the vehicle can be advanced forwardly after the rear wheels of the container engage the ground in the event the container does not move under gravity from the hoist. The winch will be used to control rearward sliding movement of the container along the hoist rails.

Figure 12:
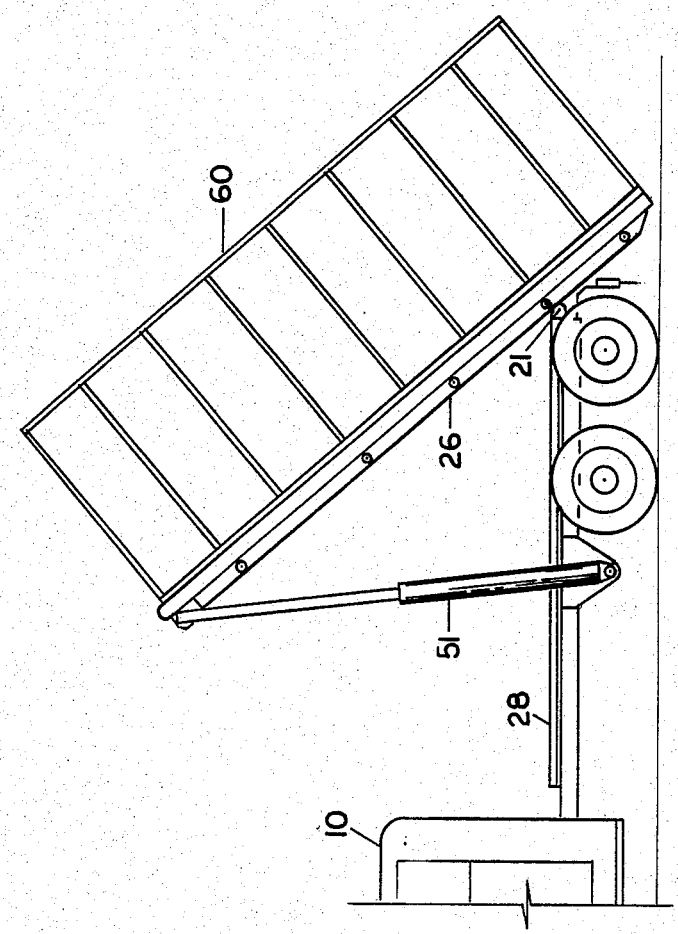
FIG. 12 is a view illustrating the positioning of the hoist of the present invention using conventional actuators.

In FIG. 12, the roll-off hoist of the present invention is shown in a position in which a roll-off container on the hoist is positioned for dumping material from the aft end of the container. Such a dumping operation is typically carried out at a land-fill area or other preselected dump site. Upon arrival at the dump site, the hoist of the present invention and container supported thereby are situated on the chassis of a vehicle as shown in FIG. 11. Sometimes a rear door is hinged to the container and it is swung to an open position Hydraulic fluid is then supplied to the piston and cylinder assemblies 51 and 52 which lift the forward end of the hoist and container supported thereon about pivot 21 at the aft portion of the vehicle. The hoist is swung in this manner to the position shown in FIG. 12 in which the pistons are fully extended from the cylinders. Normally, for example, the forward end of the hoist is swung to an elevation that is at least 17 feet above ground level. The piston and cylinder assembly 45, however, is not energized while the container is swung into the dumping position. A further feature of the present invention provides that after the container is swung into the position shown in FIG. 12, the piston and cylinder assembly 45 can be operated so that the piston moves in a back and forth direction along the cylinder with very short strokes, e.g., one-half inch, and with abrupt changes in direction by the operation of the control valves. This procedure will shake loose any tightly-compacted material in the container.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A roll-off hoist apparatus to load a container onto a vehicle and dump the content material from an opening in the rear of the container while supported by spaced-apart chassis frame members of the vehicle, said roll-off hoist apparatus including the combination of a hoist frame including parallel and spaced-apart rails to engage and support a container on said chassis frame members, means for moving a container onto said hoist frame, a carrier supported by a pivot from an aft portion of said chassis frame members, guides supported by said rails to engage said carrier for sliding said hoist frame in forward and aft directions of said chassis frame members, pivot links comprising piston and cylinder assemblies interconnecting a forward portion of said hoist frame with said vehicle frame for swinging said hoist frame about said pivot, actuator means operatively connected between said carrier and said hoist frame for both displacing said hoist frame along said carrier to jut from the aft end of the chassis frame members downwardly toward the ground and concurrently to swing the forward portion of said hoist frame about said piston and cylinder assemblies above said chassis frame members.

2. The roll-off hoist apparatus according to claim 1 wherein said carrier includes a plate overlying the aft portion of said chassis frame members, a first pivot lug means secured to said plate, and a second pivot lug means supported by said chassis frame members, said pivot interconnecting said first and second pivot lug means.

3. The roll-off hoist apparatus according to claim 1 wherein said actuator means includes a piston and cylinder assembly.

4. The roll-off hoist apparatus according to claim 3 wherein said hoist frame includes a ramp connected between aft end portions of said side rails, and means for attaching said actuator means to said ramp.

5. The roll-off hoist apparatus according to claim 1 wherein said piston and cylinder assemblies include means to entrap a fluid medium therein for forming a cushion comprised of the entrapped fluid medium.

6. A roll-off hoist apparatus to position a roll-off container for support by a chassis frame of a vehicle, said roll-off hoist including a pair of parallel and spaced-apart rails having guides thereon to slide along a carrier supported by a pivot at the rear of said chassis frame, piston and cylinder assemblies linking the forward portion of said hoist frame to said chassis frame for swinging said rails about said pivot, and actuator means operatively connected between said carrier and said rails for sliding said rails along said carrier to jut from the rear of said chassis frame downwardly to ground level while constrained by said piston and cylinder assemblies to swing the forward ends of said rails above the chassis frame.

7. A method to position a roll-off container on a wheeled vehicle, the method including the steps of using piston and cylinder assemblies to form links for swinging a forward portion of parallel hoist frame rails above a vehicle chassis by energizing an actuator operatively connected between a pivotal carrier for the hoist frame rails and the hoist frame rails to slideably move the hoist frame rails to jut from the aft portion of the vehicle substantially to ground level, pulling a container at ground level onto and along the hoist frame rails to abut against a stop, operating said actuator to move the hoist frame rails into a retracted, generally parallel and supported relation on frame members of the vehicle chassis by again swinging the frame on the links formed by said piston and cylinder assemblies, transporting the roll-off container to a dump site for dumping the contents therefrom and dumping material from an opening in the aft end of the roll-off container by swinging the hoist frame rails and roll-off container engaged therewith about a pivot at the rear of the vehicle frame by actuating said piston and cylinder assemblies coupled between the forward portions of the hoist frame rails and the vehicle chassis.

8. The method according to claim 7 including the further step of sliding the hoist frame rails forwardly onto the wheeled vehicle while supporting at least a portion of the roll-off container and before the container abuts against said stop.

* * * * *